United States Patent [19]

Qualters et al.

[11] Patent Number: 5,685,180
[45] Date of Patent: Nov. 11, 1997

[54] AUTOMOTIVE STEERING SECURITY ARRANGEMENT

[75] Inventors: Michael G. Qualters, Walsall; Derek H. Poole, Chase Terrace, both of England

[73] Assignee: C. E. Marshall (Wolverhampton) (Limited), England

[21] Appl. No.: 633,597

[22] Filed: Apr. 17, 1996

[30] Foreign Application Priority Data

Apr. 18, 1995 [GB] United Kingdom ............... 9507810

[51] Int. Cl.$^6$ .................................................. B60R 25/02
[52] U.S. Cl. .......................... 70/188; 70/186; 70/218; 70/252; 70/422; 74/530; 192/54.1
[58] Field of Search .................... 70/182–189, 190, 70/422, 218–223, 252; 192/56.1, 56.32, 54.1, 55.1, 55.2; 74/530

[56] References Cited

U.S. PATENT DOCUMENTS

| | | | |
|---|---|---|---|
| 1,155,902 | 10/1915 | Edey | 70/184 |
| 3,566,633 | 3/1971 | Borck | 70/252 |
| 5,152,363 | 10/1992 | Mertens et al. | 180/287 |
| 5,415,019 | 5/1995 | Perez | 70/185 X |

FOREIGN PATENT DOCUMENTS

| | | |
|---|---|---|
| 0129522 | 12/1984 | European Pat. Off. . |
| 2130810 | 12/1972 | Germany . |
| 2635555 | 2/1978 | Germany . |
| 3700741 | 9/1987 | Germany . |

*Primary Examiner*—Lloyd A. Gall
*Attorney, Agent, or Firm*—Pedro P. Hernandez

[57] ABSTRACT

An anti-theft security arrangement for the steering column of a motor vehicle includes a clutch which is adapted to resist turning of the steering up to a certain torque but thereafter to slip to avoid damage to the parts while still making control of the vehicle impractical. The clutch is arranged on a parallel axis to the steering column and is connected to the column through a high-ratio gear train comprising a gear wheel fast with the steering column and a pinion fast with the clutch. It is engaged and disengaged by sliding the assembly of clutch and pinion into and out of mesh with the other gear wheel. The clutch includes a rotatable shaft with teeth engaging between spring steel rods so as to turn in a series of discrete jerks if the limiting torque is exceeded.

7 Claims, 4 Drawing Sheets

AUTOMOTIVE STEERING SECURITY ARRANGEMENT

BACKGROUND AND SUMMARY OF THE INVENTION

The present invention relates to an anti-theft security arrangement for the steering of a motor vehicle.

It is well known that a conventional motor vehicle steering column lock may be overcome if sufficient torque can be applied to the steering wheel—for example by use of an extension bar inserted through the spokes of the wheel—to cause fracture of the lock bolt or of the part of the column assembly into which it locates. If this form of attack is successful, not only may the vehicle be stolen but, even if it is recovered, the column lock and/or other parts of the steering train will have to be repaired or replaced. To counter this threat, it is also known, e.g. from DE-B-2130810, DE-A-2635355, DE-C-3700741, EP-A-0129522 and U.S. Pat. No. 5,152,363, to incorporate within the length of the steering train a friction clutch or dog clutch which will limit the amount of torque which can be applied to the lock bolt. That is to say if excessive torque is applied the clutch will slip, allowing the steering wheel and column to turn in preference to breaking the lock bolt, but the high torque required to slip the clutch will still make it impractical to safely control the vehicle while the lock is engaged.

According to the present invention, an automotive steering security arrangement comprises: a steering train comprising a steering wheel and a steering column adapted to turn therewith; a first gear wheel fast with the steering train; a second gear wheel separate from the steering train and adapted to mesh with the first gear wheel whereby to be turned by the steering train through a selected gear ratio; a slippable, torque-resisting clutch associated with the second gear wheel whereby to resist turning thereof up to a limited torque; and key (or other code-input) responsive means for selectively engaging and disengaging said clutch with the steering train through said first and second gear wheels.

In use of an arrangement according to the invention the aforesaid clutch resists turning of the steering train by virtue of its engagement through the two gear wheels. By selection of an appropriately high gear ratio between the latter—which may be at least 1:2 and more preferably in the region of 1:5—the resistance to turning applied by the clutch to the second gear wheel is amplified in its effect upon the steering train. By the same token, the frictional forces experienced within the clutch, and accordingly the wear rate of its components, may be advantageously reduced for a given limiting torque upon the steering train as compared with the aforementioned prior art clutch arrangements.

In a preferred embodiment the second gear wheel is in permanent engagement with the clutch and the code-input responsive means are operable for selectively shifting the second gear wheel into and out of mesh with the first gear wheel. Alternatively the two gear wheels could be permanently in mesh and the code-input responsive means operable to selectively engage and disengage the second gear wheel with the clutch.

The clutch itself may be in the form of a simple friction clutch which applies a constant braking action upon the steering train (when engaged) but which allows the latter to turn in the event of a sufficiently high torque being applied. More preferably, however, it is adapted to make driving the vehicle even more difficult by applying an intermittent action to the second gear wheel. The clutch may therefore comprise a first clutch member, adapted to turn with the second gear wheel, provided with a ring of teeth adapted to engage, under spring pressure, in any one of a plurality of defined rotary positions with a corresponding series of formations on a second, non-rotatable clutch member. This engagement is sufficient to resist torque applied to the first clutch member up to a certain limit whereupon the spring pressure is overcome and the first clutch member snaps around to the next such position. Any turning of the steering train while engaged with the clutch can therefore only be accomplished, if at all, in a series of jerks. An appropriately high gear ratio between the two gear wheels in such an embodiment also reduces the angle through which the steering train can turn for each incremental movement of the first clutch member.

The invention will now be more particularly described, by way of example, with reference to the accompanying schematic drawings in which:

DETAILED DESCRIPTION OF THE PREFERRED EMBODIMENT

Figure 1:
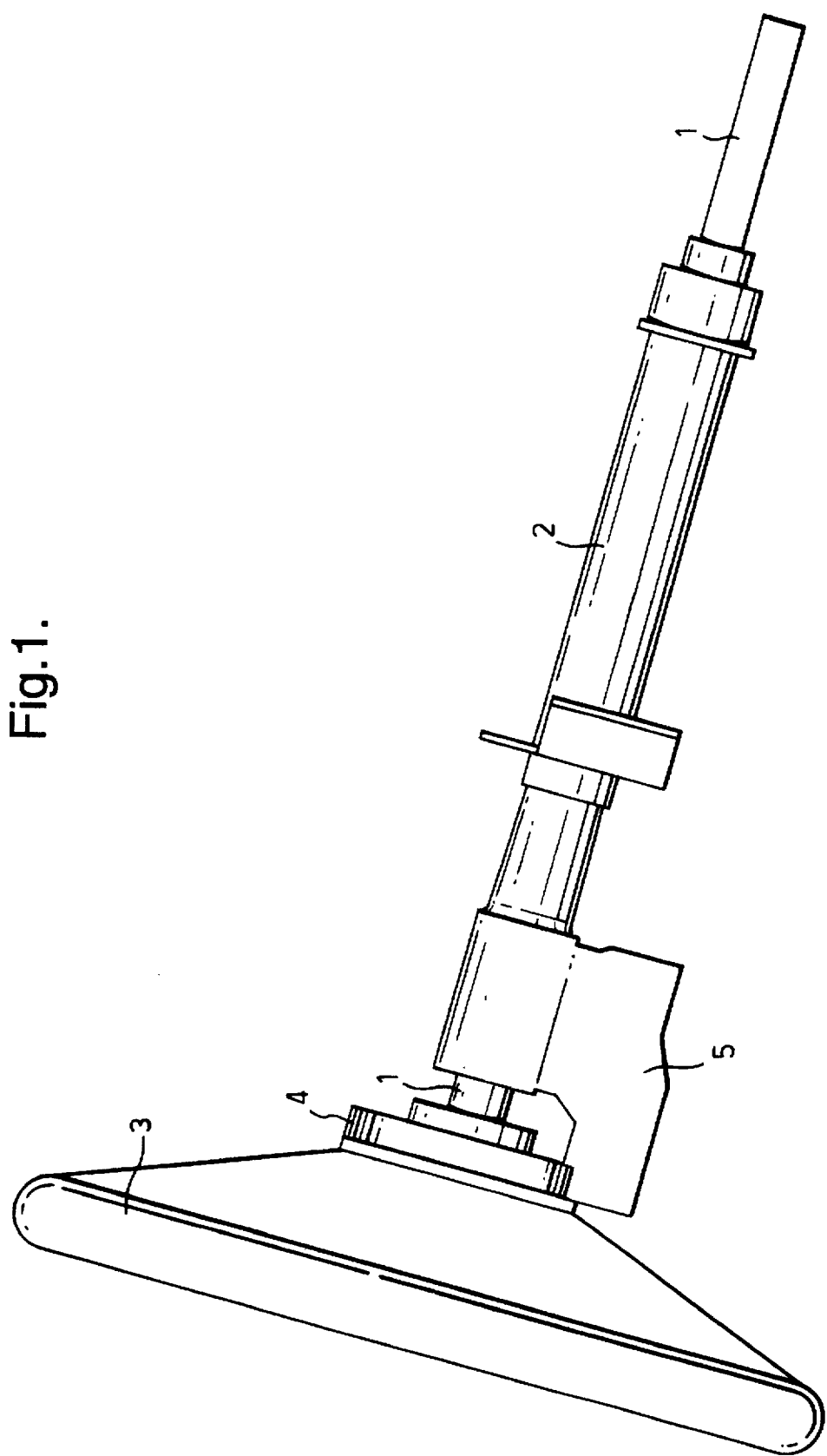
FIG. 1 is side elevation of a motor vehicle steering wheel and column equipped with a security arrangement according to a preferred embodiment of the present invention.
Figure 2:
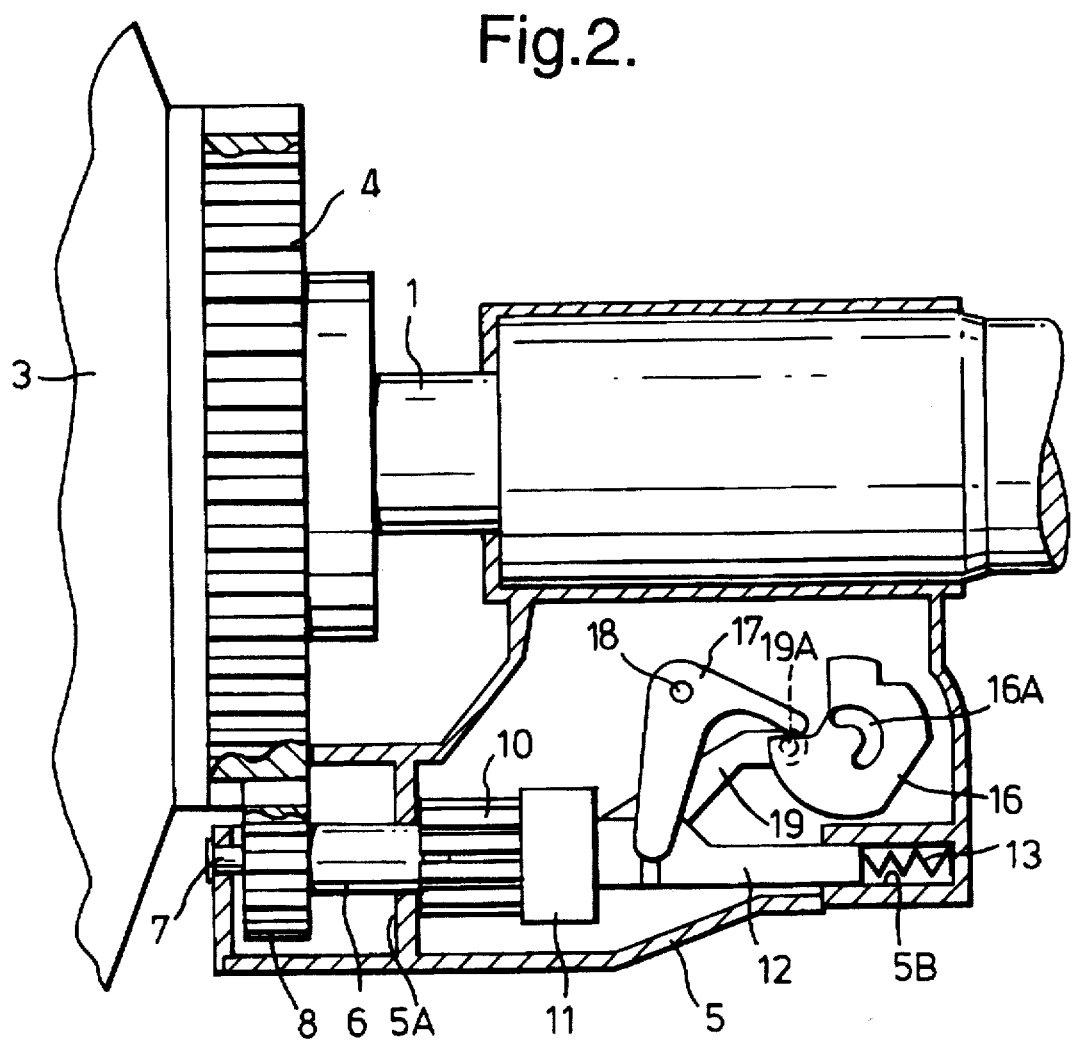
FIG. 2 illustrates to an enlarged scale the operative components of the security arrangement for the wheel and column of FIG. 1, in the secure condition.
Figure 3:
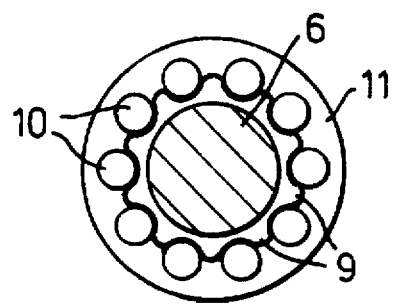
FIG. 3 is a radial cross-section to a further enlarged scale through the clutch in FIG. 2.
Figure 4:
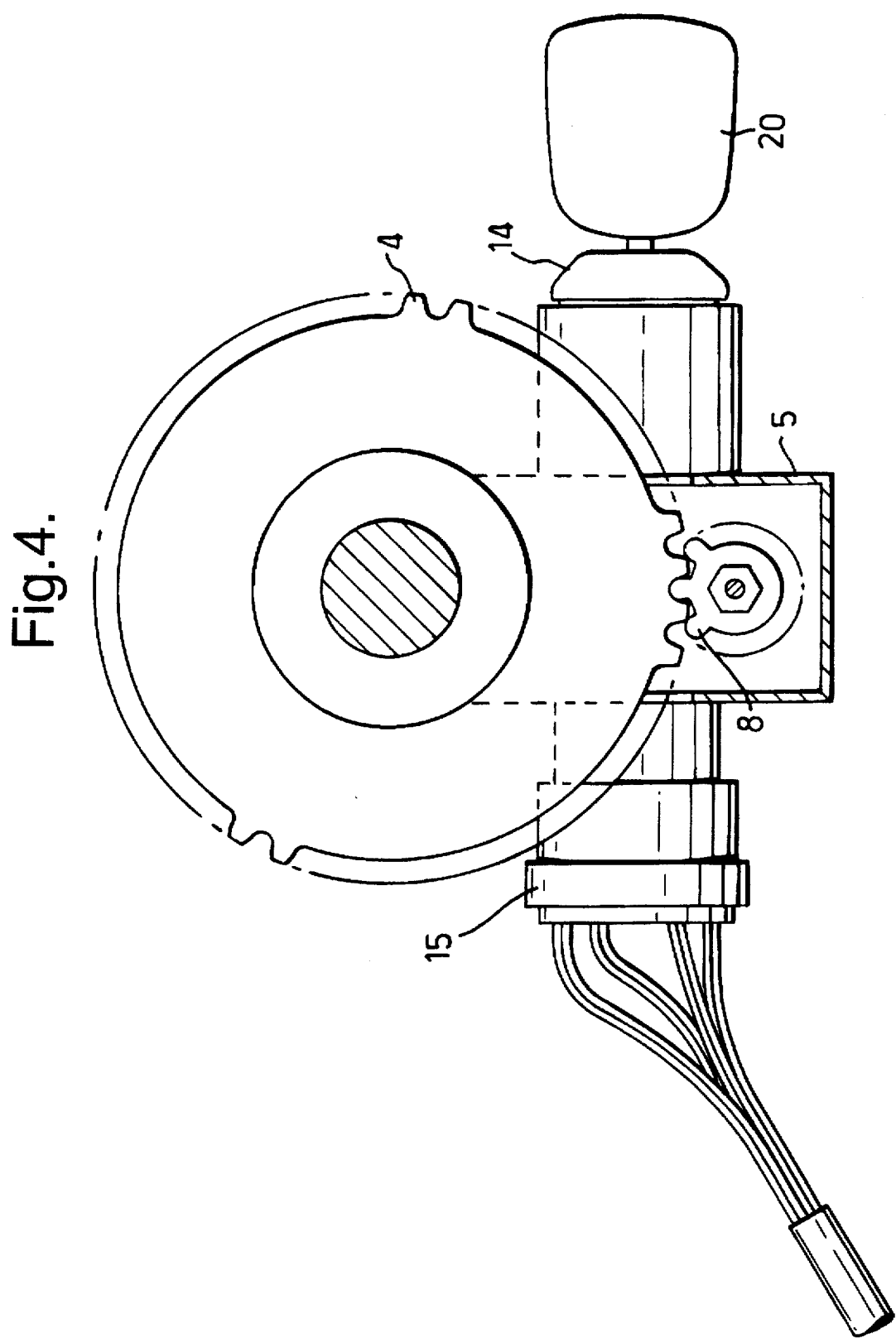
FIG. 4 is a view on the axes of the two gear wheels of the security arrangement.

Referring to FIG. 1, there is illustrated an automobile steering column 1 together with its supporting structure 2 and a steering wheel 3 fastened to its upper end. The column and wheel assembly is itself entirely conventional apart from the addition of a relatively large diameter spur gear wheel 4 which is fastened beneath the steering wheel hub so as to turn therewith. A fixed housing 5 below the upper end of the column 1 encloses the other components of the steering security arrangement, which are seen in FIGS. 2–4.

Turning to the latter, there is an assembly comprising the parts 6,8,9,10,11,12 described below, which is slidable as a whole along an axis parallel to the rotational axis of the steering train 1,3. This assembly includes a shaft 6 which in the secure condition shown in FIG. 2 is borne for rotation by a partition wall 5A of the housing 5 and by a fixed peg 7. At one end this shaft carries a second spur gear wheel or pinion 8 which in the illustrated condition is in mesh with the wheel 4. At its other end the shaft 6 carries a ring of teeth 9 (FIG. 3) which comprise one part of an intermittent torque-resisting clutch. The remainder of this clutch is comprised by a ring of spring steel rods 10 which extend from the face of a bush 11 so that normally each tooth 9 is received within the circumferential gap defined between a pair of neighbouring rods 10 as shown in FIG. 3. The bush 11 is formed on the end of a non-circular shaft 12 which is received slidably but non-rotatably in a socket portion 5B of the housing 5. A compression coil spring 13 engaging in the end of the shaft 12 normally biases the assembly of parts 6,8,9,10,11,12 to the secure condition illustrated in FIG. 2.

In this condition, it will be appreciated that torque applied to the steering wheel 3 in either direction will be transmitted through the gear wheel 4 to the pinion 8 and thence through the shaft 6 to the teeth 9. Up to a limiting value, this will be resisted by the engagement of the teeth 9 between the rods 10 on bush 11 and finally reacted by the engagement of the shaft 12 within the fixed housing socket 5B. In the illustrated embodiment the gear ratio between the wheels 4 and 8 is 1:5. In view of the mechanical disadvantage which this represents, the torque applied to the pinion 8 is a corresponding fraction of the torque applied to the steering wheel, meaning that relatively high torques at the steering wheel (e.g. at least 100 Nm) can readily be resisted by the illustrated assembly. Above a limiting value, however, the clutch 9,10 will slip to avoid damage to the components. More particularly, as the torque load on the clutch teeth 9 increases the rods 10 which they engage are stressed both tangentially and radially until the point is reached where the rods are forced over the crests of respective teeth, but only to re-engage in the space between the next adjacent pair. If a sufficient effort is applied to the steering wheel, therefore, the teeth 9 can be made to snap around between adjacent pairs of rods 10 so that the shaft 6 and pinion 8 turn in a series of jerks. The same of course applies to the steering wheel, although its turning angle for each incremental turn of the shaft 6 is reduced by the gearing between the wheels 4 and 8. In the illustrated embodiment, with ten circumferentially-spaced clutch teeth 9 and corresponding rods 10, and a gear ratio of 1:5, the steering wheel 3 can only turn through about 7° for each incremental slip of the clutch. It follows that in this condition turning of the steering wheel can be accomplished, if at all, only with great effort and in a very jerky manner, rendering control of the vehicle quite impractical.

To control the engagement and disengagement of the aforesaid clutch 9,10 with the steering train 1,3 there is a conventional lock cylinder 14 (FIG. 4) mounted transversely through the housing 5 (and shown equipped with the usual switch assembly 15 for the vehicle's ignition and other electrical circuits). The key-rotatable plug of this cylinder is equipped with a cam 16 seen in FIG. 2. This cam works against one arm of a crank 17 pivoted at 18, the other arm of which is linked to the shaft 12. An "anti wind down" arm 19 also extends from the shaft 12 for cooperation with the cam 16 as explained below.

Figure 5:
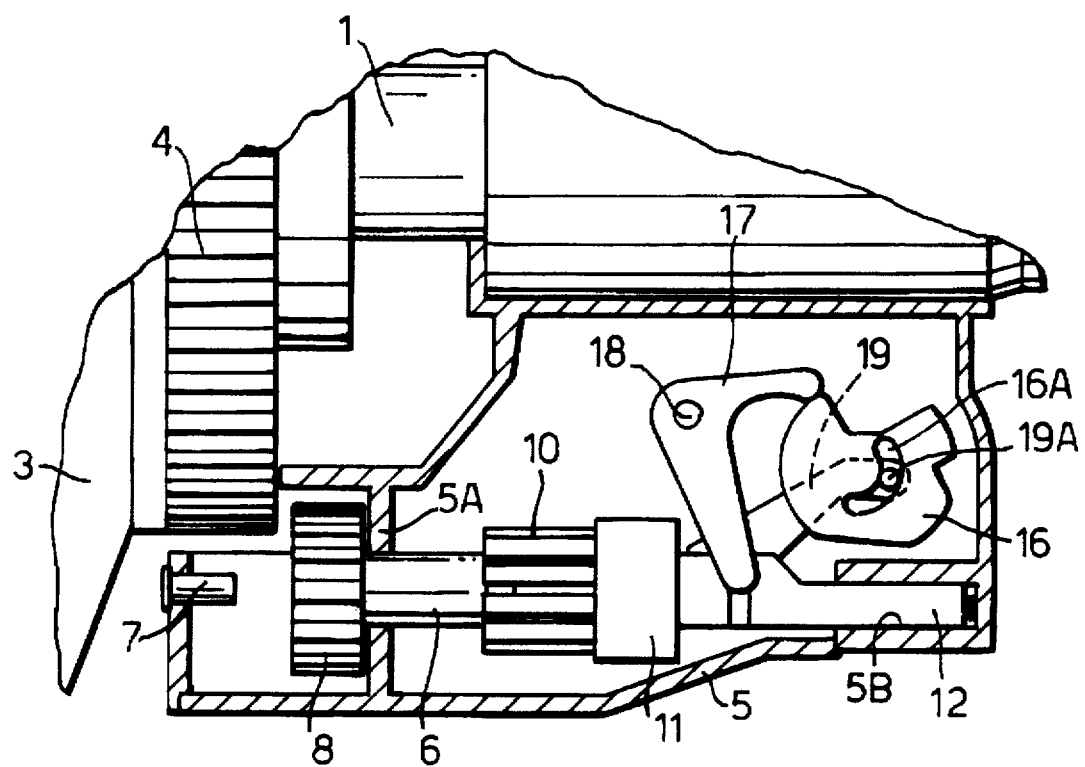
FIG. 5 is a view similar to FIG. 2 with the components in the unlocked condition.

To release the steering from the secure condition shown in FIG. 2 a properly coded key 20 is inserted into the cylinder 14 and turned to the "unlock" position. Insertion of the key imparts a slight axial movement to the cam 16 to compress a spring-loaded plunger 19A held in the end of the arm 19. Turning of the key turns the cam 16 from the position of FIG. 2 to that shown in FIG. 5, so that the crank 17 is pivoted to slide the assembly 6,8,9,10,11,12 against the bias of the spring 13 and thus withdraw the pinion 8 from mesh with the gear wheel 4. The steering train is thereby released from the restraint of the clutch 9,10. At the same time, withdrawal of the arm 19 together with the sliding assembly causes its plunger 19A to spring into an arcuate slot 16A in the cam 16. In this condition, therefore, the pinion 8 is held out of mesh with the gear wheel 4 both by the crank 17 on the surface of the cam 16 and the engagement of the arm 19 with the cam slot 16A. The form of the cam surface and the length of its slot 16A are such that further turning of the cam (clockwise as viewed in FIG. 5) is permitted as the key turns to the positions required to energise the ignition and starter motor circuits of the vehicle, without however having any effect on the axial position of the pinion 8. Subsequent turning of the key back to the "lock" position returns the cam 16 to the rotary position of FIG. 2 in which it releases the crank 17 but at this stage the pinion 8 is still held back from the wheel 4 by the engagement of the anti wind down arm 19 with the cam slot 16A. Only when the key is actually withdrawn from the cylinder 14 is the cam 16 permitted to return axially and thereby release the plunger 19A from its slot 16A, so that the sliding assembly including pinion 8 is then freed to shoot under the action of spring 13 into mesh with the gear wheel 4. This function of the arm 19 is in accordance with the standard safety requirement for vehicle steering locks that steering should not become inhibited by the inadvertent or deliberate switching off of the engine while the vehicle might still be in motion, but only by positive withdrawal of the key from the lock.

Although the steering security arrangement of the invention has been described above in terms of its operation by a purely mechanical lock cylinder and key it will be appreciated that in principle the engagement and disengagement of the torque-resisting clutch with the steering train could be controlled in response to any other convenient form of mechanical or electronic code input.

We claim:

1. An automotive steering security arrangement comprising: a steering train comprising a steering wheel and a steering column adapted to turn therewith; a first gear wheel fast with the steering train; a second gear wheel separate from the steering train and adapted to mesh with the first gear wheel whereby to be turned by the steering train through selected gear ratio; a slippable, torque-resisting clutch associated with the second gear wheel whereby to resist turning thereof up to a limited torque; and code-input responsive means for selectively engaging and disengaging said clutch with the steering train through said first and second gear wheels.

2. An arrangement according to claim 1 wherein the second gear wheel is in permanent engagement with the clutch and the code-input responsive means are operable for selectively shifting the second gear wheel into and out of mesh with the first gear wheel.

3. An arrangement according to claim 2 wherein the second gear wheel and clutch are borne for translation collectively along an axis generally parallel to the rotational axis of the steering train and the code-input responsive means are operable for selectively translating the second gear wheel and clutch along said axis between positions in which the second gear wheel is respectively in and out of mesh with the first gear wheel.

4. An arrangement according to claim 1 wherein the clutch comprises a first clutch member adapted to turn with the second gear wheel; and a second, non-rotatable clutch member; the first clutch member having a ring of teeth which are adapted to engage, under spring pressure, in any one of a plurality of defined rotary positions with a corresponding series of formations on the second clutch member; whereby in use, when a certain torque is applied to the first clutch member, the spring pressure is overcome and the first clutch member snaps around from the existing to the next adjacent said rotary position.

5. An arrangement according to claim 4 wherein said formations on the second clutch member are defined by a circumferential array of elongate spring members each fixed at one end and engaging at their respective other ends between respective pairs of adjacent said teeth.

6. An arrangement according to claim 1 wherein the gear ratio between said first and second gear wheels is at least 1:2.

7. An arrangement according to claim 6 wherein said gear ratio is in the region of 1:5.

* * * * *